US005953019A

United States Patent [19]

Shimakawa et al.

[11] Patent Number: 5,953,019

[45] **Date of Patent: *Sep. 14, 1999**

[54] IMAGE DISPLAY CONTROLLING APPARATUS

[75] Inventors: Kazuhiro Shimakawa; Kuniaki Tanaka, both of Hyogo, Japan

[73] Assignees: Mitsubishi Electric Semiconductor Software Co., Ltd., Hyogo; Mitsubishi Denki Kabushiki Kaisha, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/743,255

[22] Filed: Nov. 4, 1996

[30] Foreign Application Priority Data

Apr. 19, 1996 [JP] Japan .................................... 8-098543

[51] Int. Cl.[6] ....................................................... G06F 13/00

[52] U.S. Cl. .......................... 345/508; 345/113; 345/186; 345/345

[58] Field of Search ............................ 701/200; 345/112, 345/113, 507, 508, 344, 345, 186, 510, 188

[56] References Cited

U.S. PATENT DOCUMENTS

| | | | |
|---|---|---|---|
| 5,083,257 | 1/1992 | Kennedy | 395/131 |
| 5,170,154 | 12/1992 | Mantopoulos et al. | 340/723 |
| 5,530,797 | 6/1996 | Uya et al. | 345/508 |

FOREIGN PATENT DOCUMENTS

| | | | |
|---|---|---|---|
| 0524461 | 1/1993 | European Pat. Off. | G09G 1/16 |
| 7301542 | 11/1995 | Japan | G09G 1/16 |

OTHER PUBLICATIONS

Staudhammer et al., "High Performance Display System for Dynamic Image Generation", The Second International Conference on Computers and Applications, Beijing (Peking), Peoples' Republic of China, Jun. 23–27, 1987, pp. 336–343.

*Primary Examiner*—Kee M. Tung
*Attorney, Agent, or Firm*—Leydig, Voit & Mayer, Ltd.

[57] ABSTRACT

An image display control apparatus comprising: a plurality of image data storing units, provided corresponding to the plurality of the frames, for storing image data of frames respectively; priority display data storing unit for storing priority display data indicative of displaying image data of each frame on a priority basis; first image data comparing unit for comparing image data output from image data storing means corresponding to a frame having a highest order of the hierarchical relationship among the plurality of the frames with data stored in the priority display data storing unit; and image data selecting unit for selecting and outputting image data output from image data storing unit which stores image data of a frame having priority the priority display data indicates among the plurality of image data storing unit when it is judged that the priority display data are output from the image data storing unit as a result of comparison of the first image data comparing unit.

10 Claims, 8 Drawing Sheets

IMAGE DISPLAY CONTROLLING APPARATUS

BACKGROUND OF THE INVENTION

1. Field of the Invention

This invention relates to an image controlling apparatus which is used for a car navigation system, which sends data stored in the frame memory to a raster scan type display apparatus, and especially relates to an image display controlling apparatus which controls superimposing a plurality of images of the frames to display a desired image on the display screen.

2. Description of the Related Art

In a car navigation system, a display apparatus is used which displays a plurality of gradually scrolled maps on a fixed basic screen.

FIG. 10 shows a circuit diagram of an image controlling apparatus used for the above conventional display apparatus. Reference numeral 11 denotes a First In First Out (FIFO) memory for storing the image data of the first frame as the highest order frame, reference numeral 12 denotes a FIFO memory for storing the image data of the second frame, reference numeral 13 denotes a FIFO memory for storing the image data of the third frame, reference numeral 14 denotes a FIFO memory for storing the image data of the fourth frame as the lowest order frame. Reference numeral 15 denotes a memory previously storing color data indicating transparent and color data indicating a border for each frame in a frame hierarchy. Reference numerals 16 to 19 denote a comparator for comparing two pieces of data input from the input terminals A and B and for outputting a signal indicating equality from the terminal EQ. Reference numerals 20 to 23 each denote a switch selecting one of the two signals input from the input terminals A and B based on the signal input from controlling terminal S.

The memory 15 includes a region 15*a* storing transparent color data T1 indicating transparent in the first frame as a highest layer, a region 15*b* storing transparent color data T2 indicating transparent in the second frame, a region 15*c* storing transparent color data T3 indicating transparent in the third frame, a region 15*d* storing transparent color data T4 indicating transparency in the fourth frame and a region 15*e* storing a border color data BC indicating a color displayed at the pixel position where all the superimposed frames have transparent color data.

When the plurality of the frames are displayed by superimposing the frames on each other, it is judged whether the image data on a pixel in a frame is transparent color data or not. As a result of the judgement, the image data is selected when the data is not a transparent color data. On the other hand, when the data is a transparent color data, the data in a next lower layer frame is selected.

At first, image data in each frame is transferred to the FIFO memories 11, 12, 13 and 14. These image data includes color data indicating the combination of the colors of Red, Green and Blue (RGB) for a pixel. When a next lower frame to a certain frame is to be displayed by penetrating the certain frame, transparent color data should be written in the certain frame. Namely, in the certain frame, a color that the transparent color data indicates cannot be displayed. Transparent color data T1, T2, T3 and T4 are previously written in the regions 15*a,* 15*b,* 15*c* and 15*d,* respectively. Further, border color data BC is stored in the region 15*e* of the memory 15, which is used for display when all the frames have transparent data in a region where all the frames superimpose each other.

The image data of the first frame stored in the FIFO memory 11 is input to the image data input terminal A of the switch 23 and the image data input terminal A of the comparator 19 pixel by pixel. On the other hand, transparent color data T1 is input to the input terminal B of the comparator 19. Namely, when the image data input to the input terminal A of the comparator 19 is equal to the transparent color data T1, the comparator 19 outputs an "H" level signal from the output terminal EQ. This "H" level signal is input to the control input terminal S of the switch 23. The signal output from the output terminal Y of the switch 22 corresponding to the second frame is selected and output from the output terminal Y of the switch 23. On the other hand, when image data input to the input terminal A of the comparator 19 is not equal to the transparent color data T1, an "L" level signal is output from the output terminal EQ. This "L" level signal is input to the control input terminal S of the switch 23. Then, the image data of the first frame output from the FIFO memory 11 is selected and output from the output terminal Y of the switch 23, thereafter an image corresponding to the image data is displayed.

Operations performed for the second frame and third frame are similar to the operation for the first frame. Namely, when transparent color data in each frame is input to the FIFO memories 12 and 13, the switches 22 and 21 select and output the image data of the next lower frame. The fourth frame is the lowest frame and when the image data of the fourth frame stored in the FIFO memory 14 is equal to the transparent color data T4 for the fourth frame, the border color data BC is selected by the switch 20.

As explained above, the frame superimposing display is realized by judging pixel by pixel whether the image data of each frame is the transparent color data or not and by outputting image data from the switches 20 to 23 corresponding to the frames. Therefore, in order to display the area of a lower frame layer, it is necessary to write data to the FIFO memories 11 to 14 such that data in an area corresponding to the area of the lower frame layer is replaced with transparent color data. Namely, a large amount of accesses are generated for memory data replacement other than accesses for refreshing memory, thereby the image display speed is reduced.

When opening a window in a certain frame layer by writing transparent color data for displaying a lower frame data and when the certain frame layer is scrolled, data in the certain frame layer should be replaced as the layer is being scrolled, which requires replacement of a larger amount of data. This further affects the speed of displaying images.

FIG. 11 is a circuit diagram showing the structure of another conventional image display control apparatus. The same reference numerals are attached to the same portions of the image display control apparatus as those shown in FIG. 10. In FIG. 11, reference numeral 30 denotes a switch which selects one of the image data values output from FIFO memories 11 to 14 and the border color data value BC stored in the region 15*e* of the memory 15 based on the control signals input to the input terminals S0, S1, S2 and S3, reference numeral 31 denotes an arbiter which generates control signals to be input to the input terminals S0, S1, S2 and S3 based on the signals output from the output terminals EQ of the comparators 16 to 19.

In the image display control apparatus shown in FIG. 11, the image data of the frame layers output from FIFO memories 11 to 14 are input to the image data input terminals A0, A1, A2 and A3, as well as to the input terminals A of the comparators 16 to 19, respectively. In these comparators 16 to 19, image data of frame layers and transparent color data T1 to T4 are compared, respectively. If these pieces of data are identical, "H" level signals are output from terminals EQ of the comparators 16 to 19, respectively. The signals from terminals EQ of the comparators 16 to 19 are input to the input terminals A0, A1, A2 and A3. The arbiter 31 selects and outputs one of the image data values of each frame stored in the FIFO memories 11 to 14 and border color data value BC stored in the memory 15 based on the combination of the signals input to the input terminals A0, A1, A2 and A3.

For example, when image data values of the first frame, the second frame and the third frame output from FIFO memories 11 to 13 at a pixel position are transparent color data and when image data of the fourth frame is not transparent color data, the comparator 16 outputs a "L" level signal and comparators 17 to 19 output an "H" level signal from the terminal EQ. In this case, the arbiter 31 outputs signals from output terminals Y0, Y1, Y2 and Y3 to the S0, S1, S2 to S3 of the switch 30 such that the switch 30 selects image data output from FIFO memory 14.

In the image display controlling apparatus shown in FIG. 11, time delay of the image data output from the FIFO memory 14 in the image display control apparatus shown in FIG. 10 can be eliminated. However, in order to display a lower order frame, it is necessary to write data to the FIFO memory such that the data on the corresponding place of the higher order frame is replaced by the transparent color data, thereby display speed is lowered.

SUMMARY OF THE INVENTION

The present invention is accomplished in view of the above problems and accordingly, the object of the invention is to provide an image display control apparatus which is capable of performing image display at a higher speed.

In order to accomplish the above object, the present invention includes: a plurality of image data storing means, provided corresponding to the plurality of the frames, for storing image data of frames respectively; priority display data storing means for storing priority display data indicative of displaying image data of each frame on a priority basis; first image data comparing means for comparing image data output from image data storing means corresponding to a frame having a highest order of the hierarchical relationship among the plurality of the frames with data stored in the priority display data storing means; and image data selecting means for selecting and outputting image data output from image data storing means which stores image data of a frame having priority the priority display data indicates among the plurality of image data storing means when it is judged that the priority display data are output from the image data storing means as a result of comparison of the first image data comparing means. With this configuration, higher image processing can be obtained.

Further, the present invention includes: transparent color data storing means which stores transparent color data for penetrating each frame other than the highest order frame among the plurality of frames; border color data storing means for storing border color indicating border color to be displayed when transparency data are written to all the frames other than the frame having the highest order; second image data comparing means for comparing image data output from image data storing means corresponding to frames other than the highest order frame among the plurality of frames with transparency color data stored in the transparency color data storing means; and wherein the image data selecting means selects and outputs the border color data stored in the border color storing means when the image data coincide with the transparency color data as a result of comparison of the second image data comparing means. With this configuration, natural display can be obtained.

Further, the image data selecting means of the present invention includes: a switch which selects and outputs one out of image data output from the plurality of the image data storing means and border color data stored in the border color data storing means; and an arbiter which generates at least one control signal for selection of the switch based on results of comparisons made by the first image data comparing means and the second image data comparing means and which outputs the at least one control signal to the switch. With this configuration, higher image processing can be obtained.

Further, the present invention includes: a plurality of image data storing means, provided corresponding to the plurality of the frames, for storing image data of frames respectively; transparent data storing means for storing transparency data for each frame, indicating that the each frame is penetrated and image data of a lower frame in the hierarchical relationship are displayed when each frame is superimposed with another frame; a plurality of comparing means, provided corresponding to the plurality of the frames, for comparing image data stored in the image data storing means with transparency data for each frame stored in the transparency data storing means: image data selecting means for selecting one out of the plurality of image data storing means based on a result of comparison made by the plurality of comparing means after changing order of the hierarchical relationship of the plurality of the frames when transparency data for the highest order frame of the hierarchical relationship is output from the image data storing means corresponding to the highest order frame of the hierarchical relationship and for outputting image data stored in the selected image data storing means. With this configuration, higher display processing can be obtained because the amount of accesses for writing transparency data can be reduced.

Further, the image data selecting means of the present invention includes: a switch which selects one out of image data output from the plurality of image data storing means; and an arbiter which generates at least one control signal for selection of the switch based on results of comparisons made by the plurality of comparing means and which outputs the at least one control signal to the switch. With this configuration, higher display processing can be obtained.

Further, the arbiter of the present invention sends at least one control signal to the switch such that hierarchical orders of specific two frames other than the highest order frame among the plurality of frames are exchanged. With configuration, higher display processing can be obtained.

Further, the arbiter of the present invention sends at least one control signal to the switch such that hierarchical orders of frames other than the highest order frame among the plurality of frames are reversed. With this configuration, higher display processing can be obtained because amount of accesses for writing transparency color data when lower frames are frequently displayed.

Further, the present invention includes: a mode register for storing data indicative of a mode out of the first mode in which there are the highest order frame and other frames having equal order in the hierarchical relationship and in which image display control is performed based on the priority display data, and the second mode in which each of the plurality of frames has a higher order or a lower order to other frames in the hierarchical relationship; and image data selecting means for selecting and outputting image data output from image data storing means which stores image data of a frame having priority the priority display data indicates among the plurality of image data storing means when it is judged that the priority display data are output from the image data storing means as a result of comparison of the first image data comparing means in a case where data indicative of the first mode is stored in the mode register, and for selecting one out of the plurality of image data storing means based on a result of comparison made by the plurality of second comparing means after changing order of the hierarchical relationship of the plurality of the frames when transparent data for the highest order frame of the hierarchical relationship is output from the image data storing means corresponding to the highest order frame of the hierarchical relationship and for outputting image data stored in the selected image data storing means in a case where data indicative of the second mode is stored in the mode register. With this configuration, various and high speed display can be realized.

DETAILED DESCRIPTION OF THE PREFERRED EMBODIMENTS

The preferred embodiments of the present invention are explained hereinafter in detail with reference to the drawings.

Embodiment 1

Figure 1:
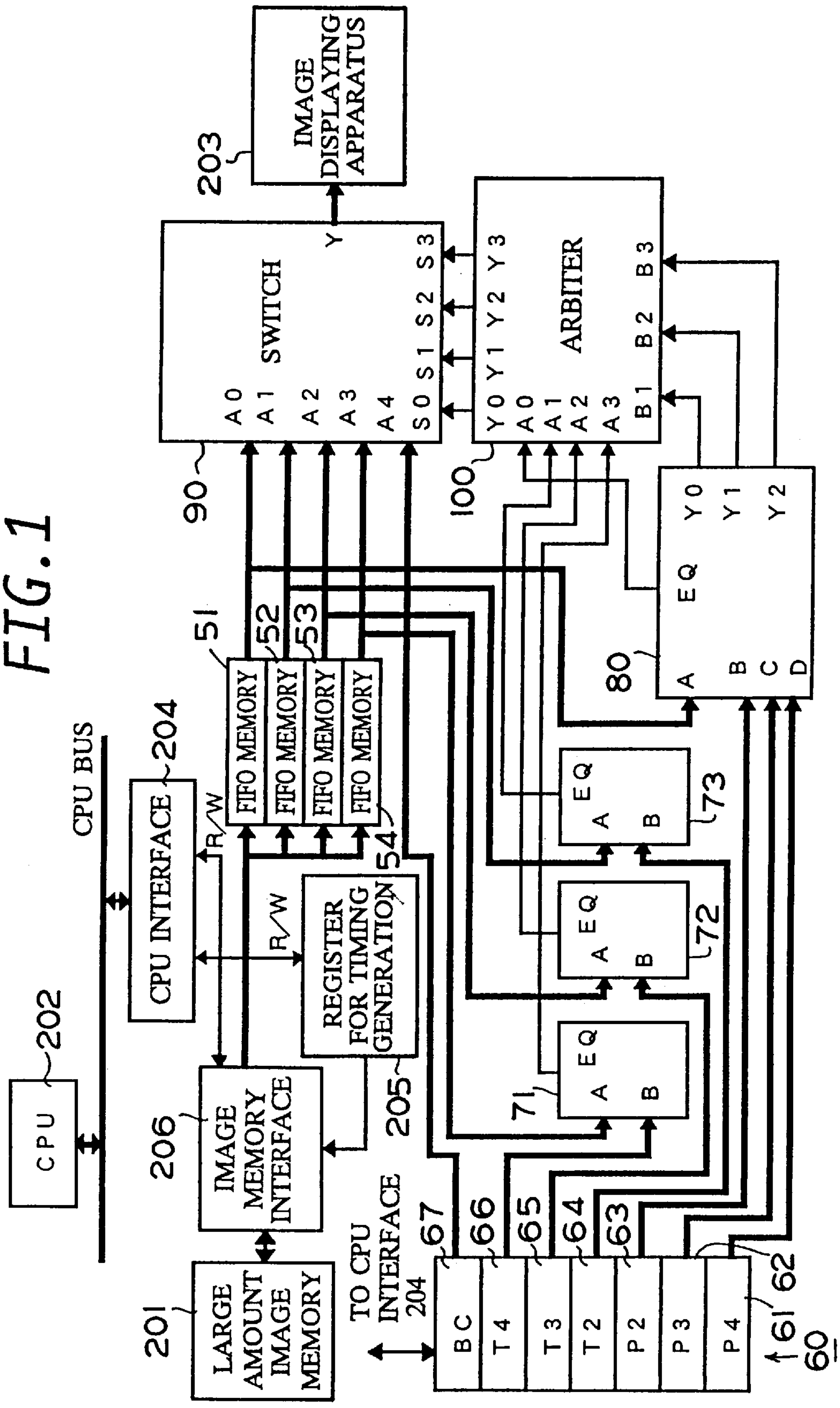
FIG. 1 is a circuit diagram showing the configuration of an image display control apparatus according to a first embodiment of the present invention.

FIG. 1 is a circuit diagram showing an image display apparatus according to the first embodiment of the present invention. Reference numeral 51 denotes a First-In First-Out (FIFO) memory for storing image data of the first frame as the highest order frame, reference numeral 52 denotes a FIFO memory for storing image data of the second frame, reference numeral 53 denotes a FIFO memory for storing the image data of the third frame, reference numeral 54 denotes a FIFO memory for storing the image data of the fourth frame as the lowest order frame. Reference numeral 60 denotes a memory which stores transparent color data for respective frames, border color data and priority display color data for the second, the third and the fourth frames. Reference numerals 71 to 73 each denote comparators which compares two pieces of image data input to the input terminals A and B which outputs an "H" level signal from the terminal EQ when both pieces of data are the same and which outputs an "L" level signal from the terminal EQ when both pieces of data are not the same.

Further, reference numeral 80 denotes a comparator which compares image data input from input terminal A with priority display color data input from the input terminals B, C and D, respectively, and which outputs the compared results. Reference numeral 90 denotes a switch which selects one of the image data values output from FIFO memories 51 to 54 and border color data value BC stored in the region 67 of the memory 60 based on the control signal input from input terminals S0, S1, S2 and S3. Reference numeral 100 denotes an arbiter which generates control signals to be input to the input terminals S0, S1, S2 and S3 of the switch 90 based on the signals output from the output terminals EQ of the comparators 71 to 73 and the output terminal EQ of the comparator 80.

Reference numeral 201 denotes a large amount image memory for storing image data. Reference numeral 202 denotes a Central Processing Unit (CPU) for controlling the respective portions of the image display control apparatus. Reference numeral 203 denotes an image displaying apparatus for converting the data from the switch 90 to RGB type data by referring to a palette and for displaying the RGB type data on a screen. Reference numeral 204 denotes a CPU interface for signal interfacing between the CPU 202 and image display control apparatus. Reference numeral 205 denotes a register for timing generation which stores data used for controlling the timing of the sending the image data from the large amount image memory 201 to FIFO memories 51 to 54 and raster scan. Reference numeral 206 denotes image memory interface for sending image data from the large amount image memory 201 to FIFO memories 51 to 54 based on the data stored in the register 205 for timing generation under the instruction of the CPU interface 204.

Figure 2:
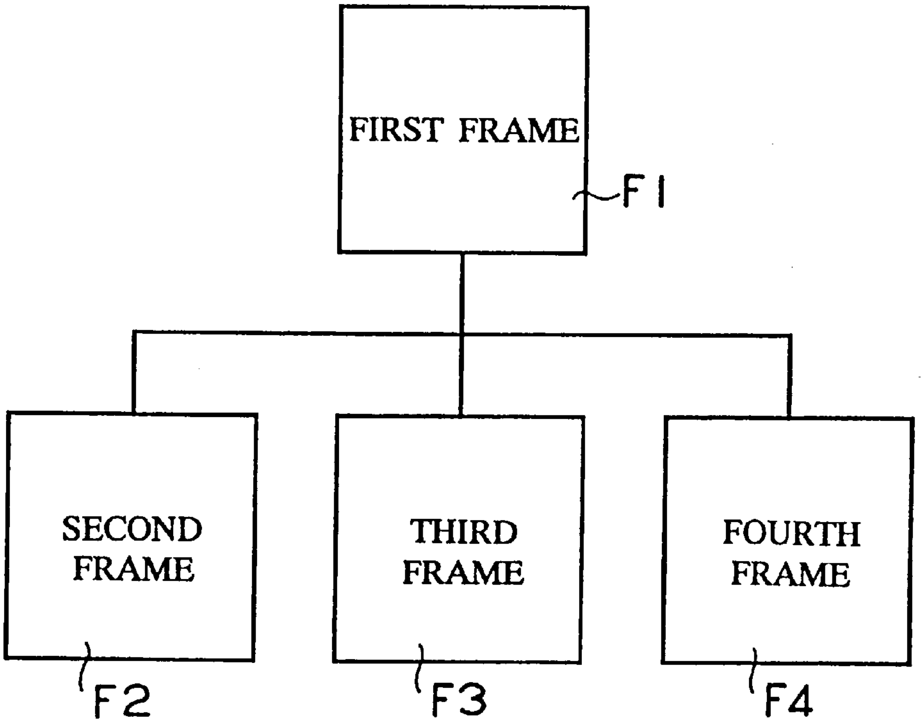
FIG. 2 shows a hierarchical structure of frames in the first embodiment of the present invention.

FIG. 2 shows a hierarchical structure of the frames of this embodiment. As shown in FIG. 2, only the first frame F1 as the highest order frame is decided physically and the second, third and fourth frames F2, F3 and F4 are equivalent to each other. However, the image can be displayed such that the second, third and fourth frames have a hierarchical structure by using a software method. For example, when an image of the second frame is displayed on a certain position of the first frame, the image of the second frame is displayed at a certain position of the first frame on a priority basis. The priority display data should be written in the first frame and stored in FIFO memory 51. The priority display data P2, P3 and P4 for the second frame, third frame, and fourth frame are stored in the regions 63, 62 and 61 of the memory 60. The regions 64, 65, 66 include transparent color data T2, T3 and T4, respectively.

Under the control of image memory interface 206, the image of the second, third, and fourth frames are transferred from the image memory 201 to the FIFO memories 51 to 54.

Figure 3:
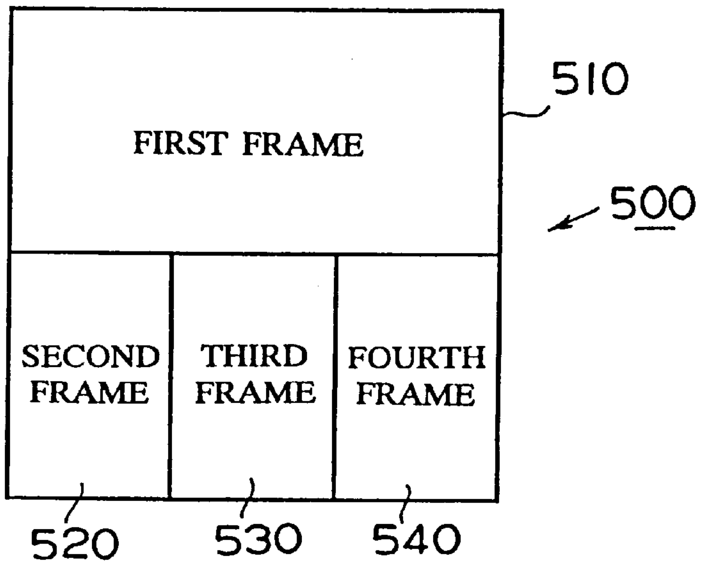
FIG. 3 shows an example of combining respective frames to constitute one screen.

FIG. 3 shows an example of combining frames to constitute one screen. In FIG. 3, reference numeral 500 denotes a screen. Reference numeral 510 denotes an area for displaying the image of the first frame. Reference numeral 520 denotes an area for displaying the image of the second frame. Reference numeral 530 denotes an area for displaying the third frame and reference numeral 540 denotes an area for displaying the fourth frame.

Figure 4:
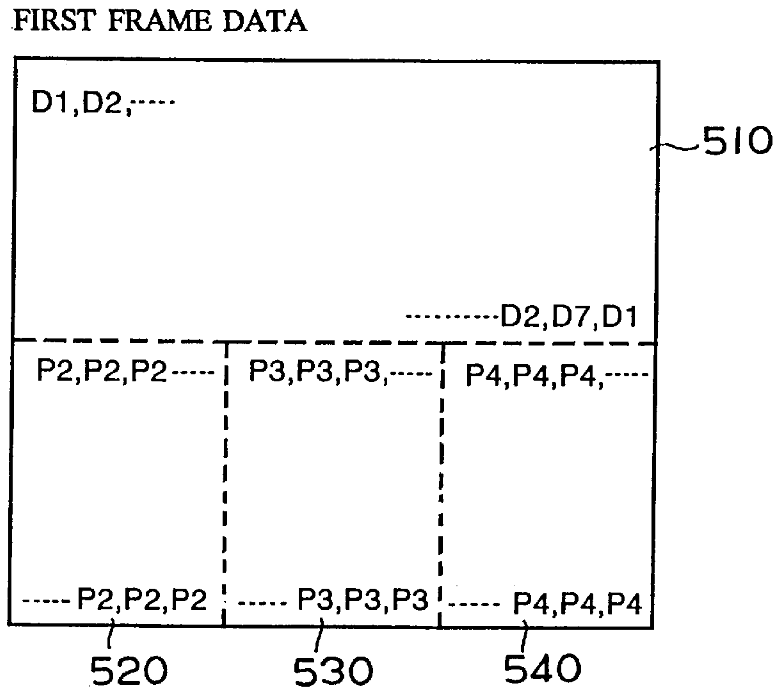
FIG. 4 shows data to be written to the FIFO memory in a case where the display layout shown in FIG. 3 is adopted.

FIG. 4 shows first frame data to be written to the FIFO memory 51 in a case where the screen structure shown in FIG. 4 is adopted. In FIG. 4, P2 denotes a priority display data of the second frame, P3 denotes a priority display data of the third frame, P4 denotes a priority display data of the fourth frame. As shown in FIG. 4, the area 510 includes image data other than P2, P3 and P4. Namely, the area 510 includes color data corresponding to each pixel. The area 520 is filled only with the data P2. The area 530 is filled only with data P3, and the area 540 is filled only with data P4.

At first, image data of the first frame output from the FIFO memory 51 is input to the image data input terminal A0 of the switch 90 and to the image input terminal A of the comparator 80. The image data of the second frame output from the FIFO memory 52 is input to the image input terminal A1 of the switch 90 and to the image input terminal A of the comparator 73. The image data of the third frame output from the FIFO memory 53 is input to the image input terminal A2 of the switch 90 and to the image input terminal A of the comparator 72. The image data of the fourth frame output from the FIFO memory 53 is input to the image data input terminal A3 of the switch 90 and to the image data input terminal A of the comparator 71.

In the case of the screen structure shown in FIG. 3, priority display data P2, P3, or P4 is not written to the area 510. Therefore, the data input from input terminal A of the comparator 80 cannot be equal to the priority display data stored in the regions 61, 62, or 63 of the memory 60. Thus, a "L" level signal indicating inequality of the data is output from output terminal EQ of the comparator 80. In this case, a "H" level signal is output from the output terminal Y0 and a "L" level signal is output from the output terminals Y1, Y2, and Y3, thereby the switch 90 selects the image data input from image input terminal A0 and outputs the selected image data from the output terminal Y.

When a scan to the area 520 begins, the priority display data P2 is output from the FIFO memory 51. Therefore, the data input to the input terminal A of the comparator 80 becomes the same as the data input from the input terminal B of the comparator 80. Thus, a "H" level signal is output from output the terminal EQ and the output terminal Y0 of the comparator 80 and a "L" level signal is output from the output terminals Y1 and Y2. When these signals are input to the input terminals B1, B2, and B3 of the arbiter 100, a "H" signal is output from the output terminal Y1 and a "L" signal is output from the output terminals Y0, Y2, and Y3. Then, the switch 90 selects the image data of the second frame from FIFO memory 52 input to the input terminal A1 and outputs the selected image data from the output terminal Y. Similarly, when a scan to the area 530 begins, the image data of the third frame output from the FIFO memory 53 is output from the output terminal Y of the switch 90. Further, when a scan to the area 540 begins, the image data of the fourth frame output from the FIFO memory 54 is output from the output terminal Y of the switch 90.

Therefore, the structure for superimposing four frames can be realized by writing the priority display data corresponding to the each frame to the first frame. Accordingly, even if the second, third, and fourth frames are scrolled in arbitrary directions, natural and high speed image display can be performed since data replacement for fixing a window position is not necessary.

When the image data of the frame which is displayed on a priority basis is transparent color data, the arbiter 100 outputs an "H" signal from the output terminals Y0 to Y3. In this case, the border color data BC stored in the region 67 of the memory 60 is selected and outputted by the switch 90. For example, assuming that priority display data P2 indicating that the second frame has the priority for display is output from FIFO memory 51, a "H" level signal indicating that the second frame has the priority for display is output from the output terminal Y0 of the comparator 80. At this time, the image data of the second frame output from FIFO memory 52 is compared with the transparent color data T2 previously stored in the region 64 of the memory 60 by the comparator 73. When the two pieces of data input to the comparator 73 are equal, comparator 73 outputs a "H" level signal from the output terminal EQ. The arbiter 100 outputs "H" level signals from the output terminals Y0 to Y3, respectively, when both of the signals input to the input terminal A0 and the input terminal B1 become a "H" level. These signals are input to the control signal input terminals S0 to S3 of the switch 90. In this case, the switch 90 selects image data input to the input terminal A4 of the switch 90, i.e., the border color data BC stored in the region 67 of the memory 60 and outputs the selected data from the output terminal Y. The RGB data for displaying the selected image data are generated based on the image data output from the output terminal Y of the switch 90 by referring to the palette.

In the above explanation, when the transparent color data is written to the frame which is displayed on priority basis, the border color data BC is output. However, in this case, the arbiter 100 may send control signals to the switch 90 so that the arbiter 100 selects the image data from another FIFO memory. For example, assuming that the transparent color data T3 is output from the FIFO memory 53 corresponding to the third frame when the priority display data P3 for the third frame is output from FIFO memory 51, a "H" level signal is output from the output terminal EQ and the output terminal Y1 of the comparator 72. In this case, the arbiter 100 may select the image data output from the FIFO memory 52 or the FIFO memory 54 and may output the selected image data to the switch 90. With this structure, a hierarchical display of the frames can be performed without re-writing priority display data of the FIFO memory 51 by software.

Embodiment 2

Figure 5:
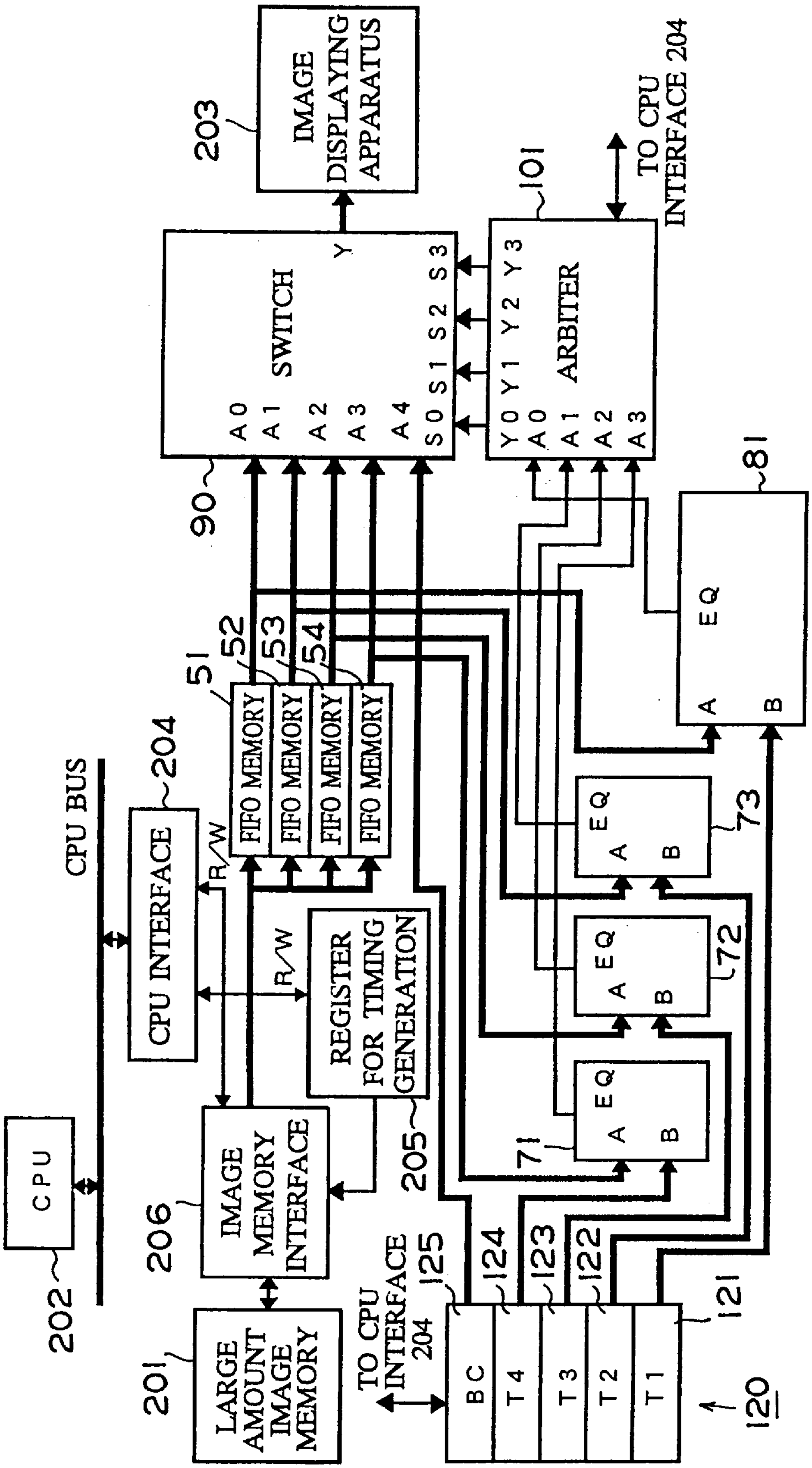
FIG. 5 is a circuit diagram showing the structure of an image display control apparatus according to a second embodiment of the present invention.

FIG. 5 is a circuit diagram showing the structure of the image display control apparatus according to the second embodiment of the present invention. The same reference numerals are attached to the same portions as those shown in FIG. 1 and duplicate explanations are omitted. In FIG. 5, reference numeral 120 denotes a memory storing transparent color data T1 to T4 for the first to fourth frames and border color data BC. Reference numeral 81 denotes a comparator which compares image data input from the input terminals A and B and outputs the result of the comparison from the output terminal EQ. Reference numeral 101 denotes an arbiter for generating signals to be input to the control signal input terminals S0 to S3 of the switch 90 based on the signals output from the output terminals EQ of the comparators 71 to 73 and 81. The arbiter 101 is connected to the CPU interface 204 and has a function to change output signals according to instructions from the CPU 202.

Figure 6:
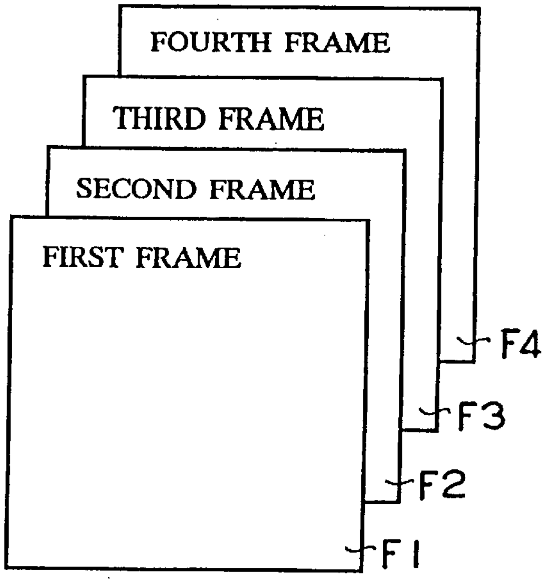
FIG. 6 shows a hierarchical structure of frames in the second embodiment of the present invention.

FIG. 6 shows the hierarchical structure of the frames in this embodiment. As shown in FIG. 6, image data of the frames stored in FIFO memories 51 to 54 have a hierarchical structure. Namely, the structure is adopted where the first frame F1 is the highest order (front) layer, the second frame F2 is the next lower order layer to the first frame F1, the third frame F3 is the next lower order layer to the second frame F2, and the fourth frame F4 is lowest order layer.

Figure 11:
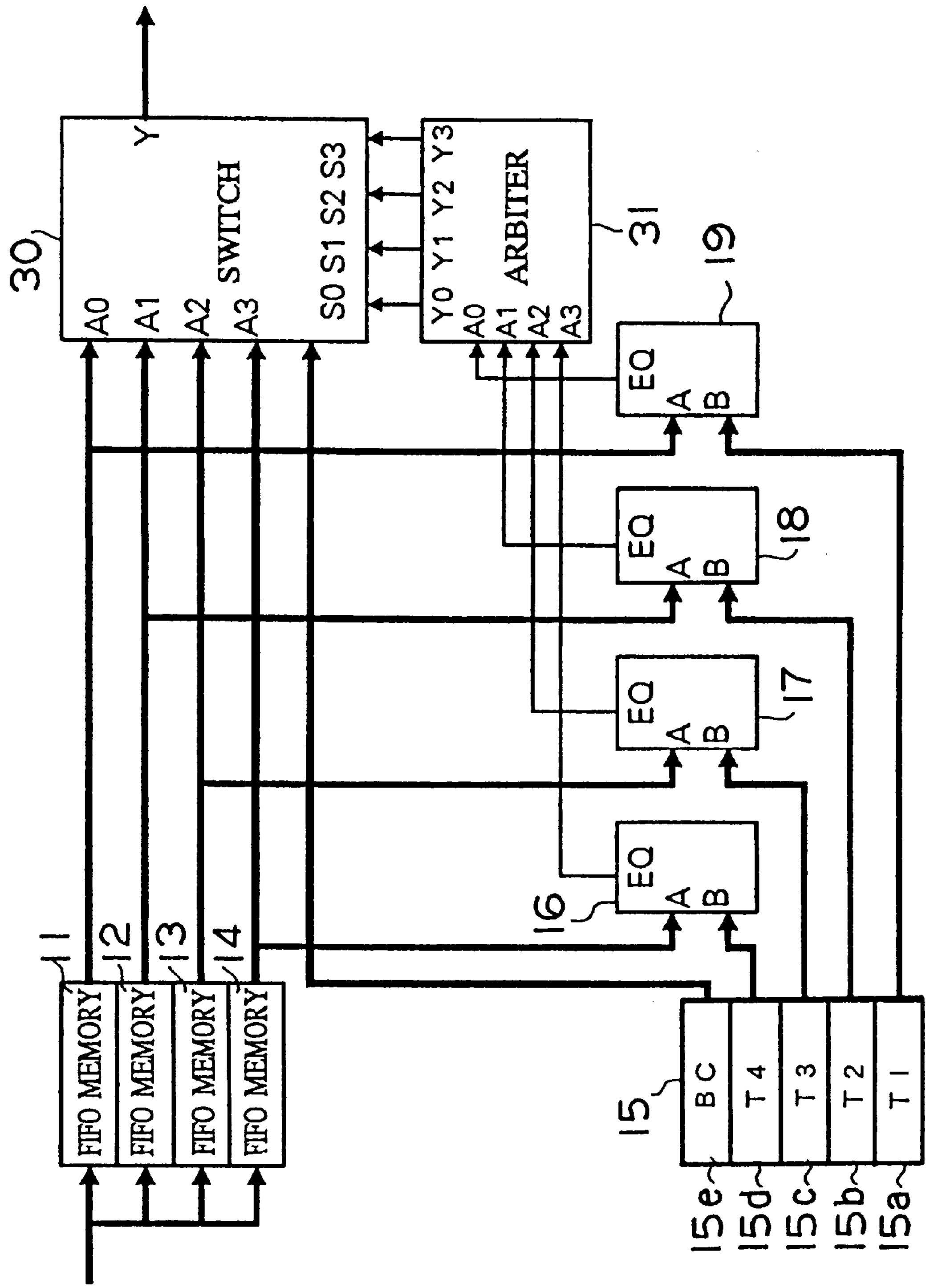
FIG. 11 (PRIOR ART)
FIG. 11 is a circuit diagram showing the structure of another conventional image display control apparatus.

At first, the explanation will be made for the case where the CPU 202 does not send instructions for changing the output control signals to the arbiter 101. In this case, the apparatus of this embodiment works similarly to the conventional image display apparatus shown in FIG. 11. Namely, the hierarchical structure shown in FIG. 6 is fixed and transparent color data T1 should be written to the first frame in order to display the image of the second frame for example. Then, the comparator 81 outputs a "H" signal from the output terminal EQ. At this time, if the image data of the second frame output from the FIFO memory 52 is not the transparent color data T2, a "L" level signal is input to the input terminal A1 of the arbiter 101. In this case, the arbiter 101 outputs a "H" level signal from the output terminal Y1 and outputs a "L" level signal from the output terminals Y0, Y2, and Y3. When these signals are input to the control input terminals S0, S1, S2, and S3, the switch 90 selects the image data input from the input terminal A1 and outputs the selected image data from the output terminal Y. When the image of the third frame is displayed, transparent color data is written to the first and second frames. At this time, if the image data of the third frame are not transparent color data, a "H" level signal, a "H" level signal and a "L" level signal are input to the input terminals A0, A1 and A2 of the arbiter 101, respectively. At this time, the arbiter 101 outputs a "H" level signal only from the output terminal Y2 and outputs a "L" level signal from the output terminals Y0, Y1, and Y3. Then, switch 90 selects the image data input from the input terminal A2, i.e., image data of the third frame and outputs the selected data from the output terminal Y. Similarly, when the image data of the fourth frame is displayed, the transparent color data T1, T2, T3 are written to the first, second and third frames.

Figure 7:
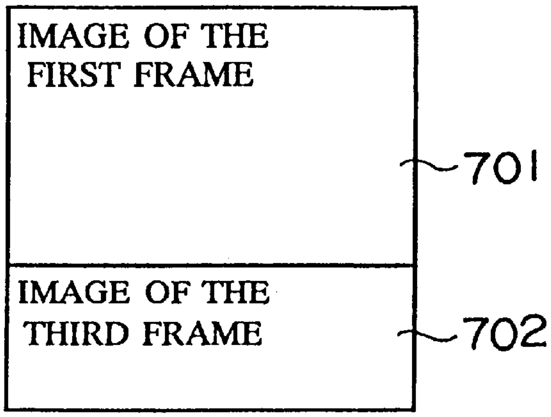
FIG. 7 shows an example of display screen layout in the second embodiment of the present invention.

Next, the explanation will be made to the case where the CPU 202 sends instructions to the arbiter 101 for changing output signals of the arbiter 101. FIG. 7 shows an example of the display structure of the screen. In FIG. 7, reference numeral 701 denotes the image of the first frame and reference numeral 702 denotes the image of the third frame. When this kind of display is performed, signals to be output from the output terminals Y0, Y1, Y2, and Y3 are changed based on the data sent from the CPU 202 or the data previously set in the arbiter 101.

These signals are changed as follows. Namely, when image shown in FIG. 7 is displayed, the transparent color data T1 is written to the area of the first frame corresponding to the portion of the image of the third frame. While the image of the first frame is being displayed, a "L" level signal indicating inequality of the comparison is output from the output terminal EQ of the comparator 81. At this time, a "H" level signal is output from the output terminal Y0 and switch 90 outputs the image data of the first frame sent from the FIFO memory 51, similarly to the case where output signals are not changed. When the raster scan comes to the image data of the third frame, a "H" level signal indicating coincidence of the comparison is output from the output terminal EQ of the comparator 81. When a "H" signal is input to the input terminal A0 of the arbiter 101, the arbiter 101 exchanges the signals input to the input terminals A1 and A2 and further exchanges the signals to be output from the output terminals Y1 and Y2. Namely, the second frame and third frame in a hierarchical structure shown in FIG. 6 are exchanged.

Therefore, when the raster scan comes to the image 702 of the third frame, the image data of the third frame output from FIFO memory 53 are output instead of the image data of the second frame. Therefore, the above configuration eliminates the need of writing transparency color data to the second frame. This enables higher speed image display.

While the first frame is being scanned, when the transparent color data T1 is found, image data of the fourth frame may be displayed in place of the third frame image data by changing the setting from the CPU 202 or by previously changing the internal setting of the arbiter 101.

Embodiment 3

Figure 8:
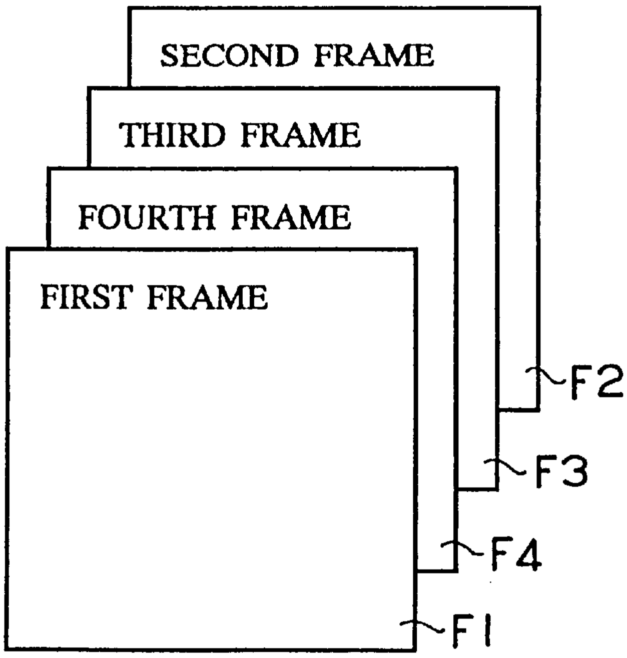
FIG. 8 shows frames if which priority order of in the frame hierarchy is reversed in the second embodiment of the present invention.

The basic configuration of the image display control apparatus according to this embodiment is similar to the configuration of the second embodiment shown in FIG. 5. However, the image display control apparatus of this embodiment differs from that of the second embodiment in the following points. Namely, the arbiter 101 of the image display control apparatus of this embodiment performs operations different from those of the second embodiment when the CPU 202 sends instructions for changing output signals to the arbiter 101. When the image data output from the FIFO memory 51 is the transparent color data T1, a "H" level signal is input to the input terminal A0 of the arbiter 101. At this time, the arbiter 101 regards the input signals input to the input terminals A1, A2, and A3 as signals input to the input terminals A3, A2, and A1 in the reverse order. Further, the arbiter 101 outputs the signals to be output from the output terminals Y1, Y2, and Y3 from the terminals Y3, Y2, and Y1 in the reverse order. Therefore, as shown in FIG. 8, priority order is reversed in the second frame F2, third frame F3 and fourth frame F4. Namely, The priority display order from the highest order frame is changed to the order of the first frame F1, the fourth frame F4, the third frame F3, and the second frame F2. Accordingly, when lower order frames should be displayed frequently due to the display situation change, higher image display can be obtained since frames to which the transparency color data is to be written are reduced owing to the fact that the priority order is reversed.

Concerning the second and third embodiments using four frames to be superimposed each other, the result of the case where the priority order of the second frame and fourth frame is exchanged in the second embodiment is equivalent to the result of the case where the priority order of the second frame to the fourth frame is reversed in the fourth embodiment. However, the present invention can be applied to the image display control apparatus which superimposes five or more than five frames. In this case, the exchange of two of the display priorities of the frames after the first frame is different from reversing the priority order of the frames after the first frame.

Embodiment 4

Figure 9:
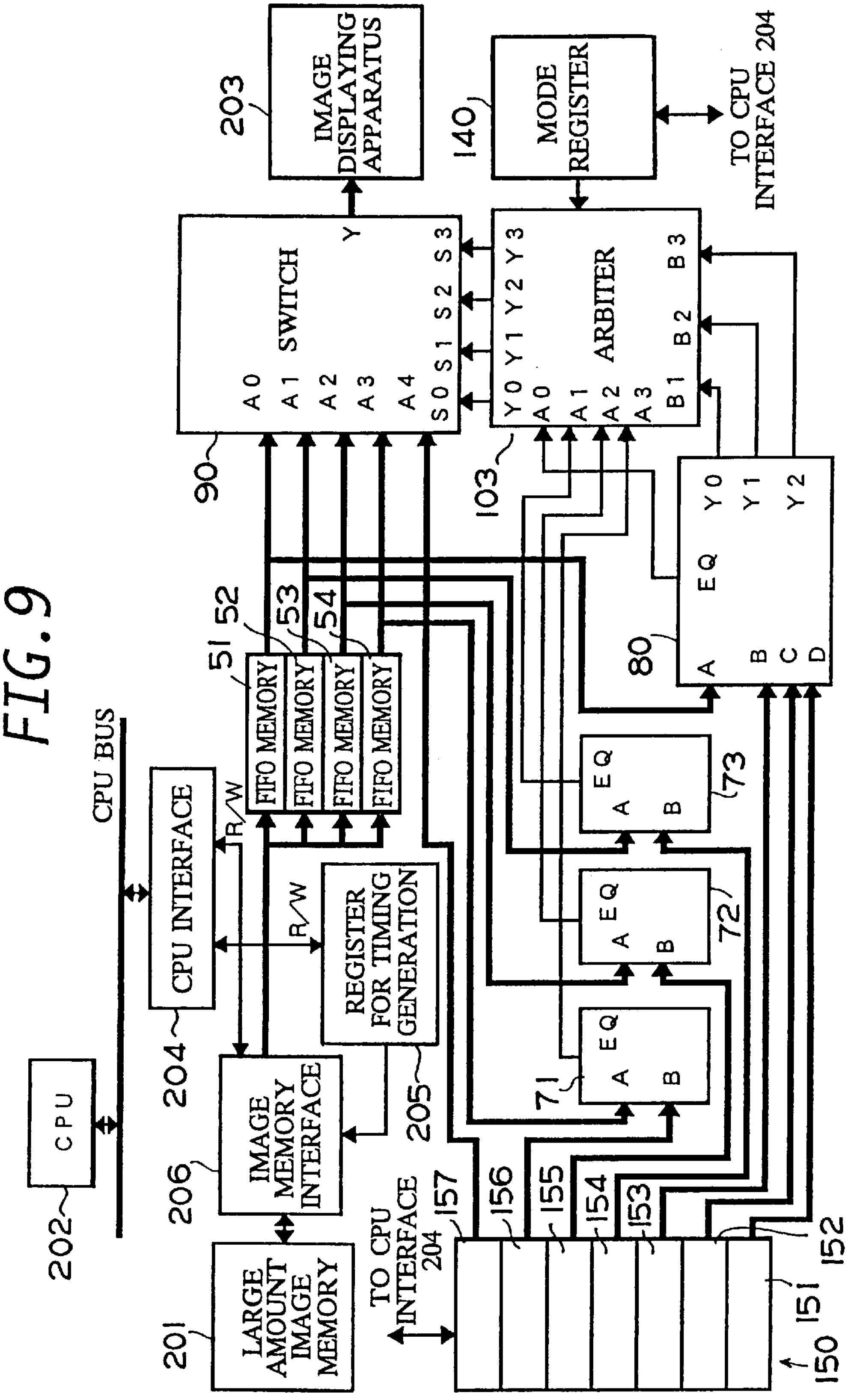
FIG. 9 is a circuit diagram showing the structure of an image display control apparatus according to a third embodiment of the present invention.
Figure 10:
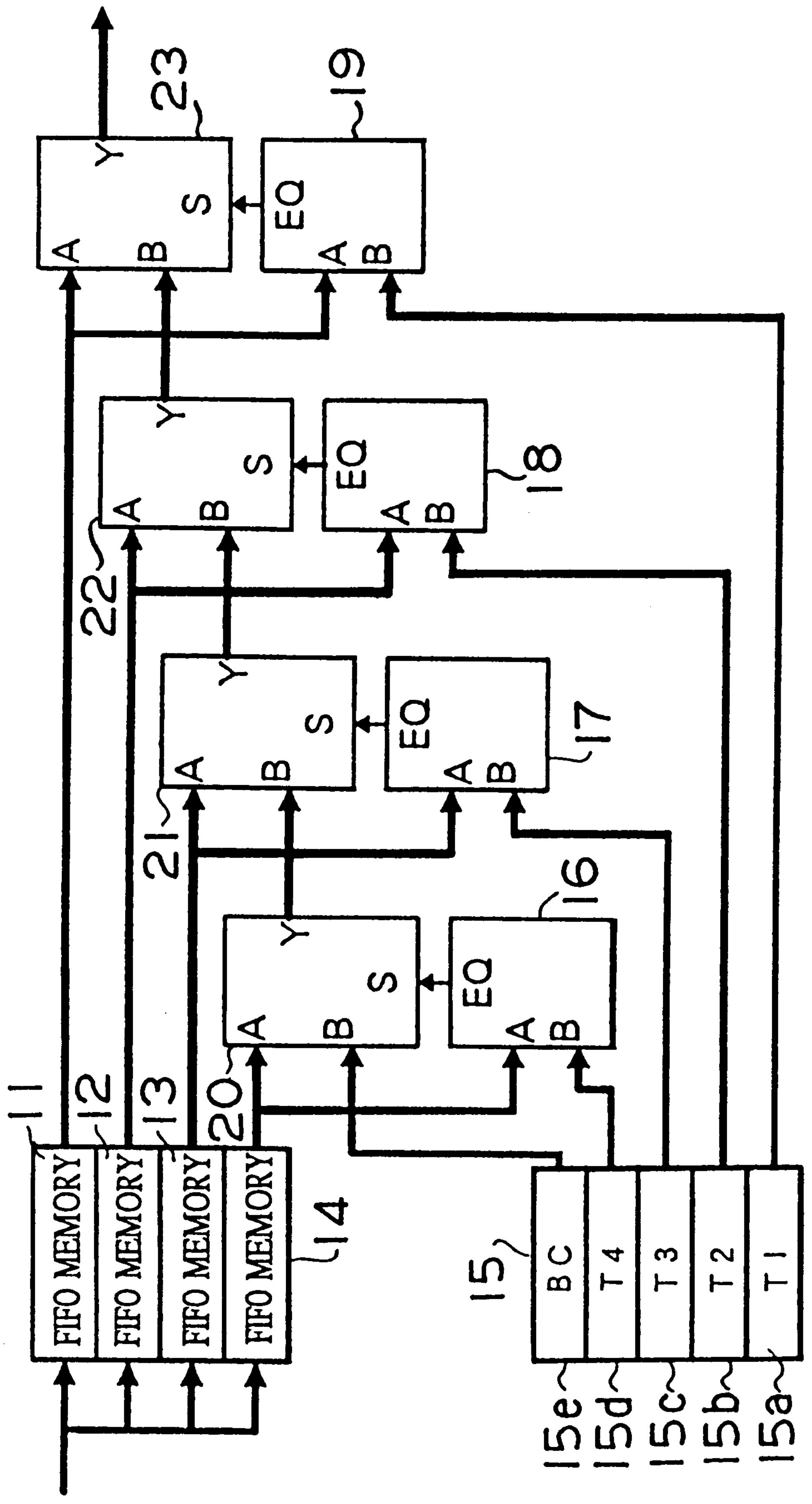
FIG. 10 (PRIOR ART)
FIG. 10 is a circuit diagram showing the structure of the conventional image display control apparatus used for an image display.

FIG. 9 is a circuit diagram showing the configuration of the fourth embodiment of the present invention. The same reference numerals are attached to the same portions as those shown in FIG. 1 and duplicate explanations are omitted. The image display control apparatus can perform operations of the first, second and third embodiments with one circuit by changing the mode of the image display control apparatus. In FIG. 9, reference numeral 140 denotes a mode register for storing a value indicating in which mode the image display control apparatus operates under the control of the CPU 202. Reference numeral 103 denotes an arbiter which deals with the signals input to the input terminals A0, A1, A2, and A3 and controls the signals output from output terminals Y0, Y1, Y2, and Y3 based on the value stored in the mode register 140. Reference numeral 150 denotes a memory having regions 151, 152, 153, 154, 155, 156, and 157 to which the data can be written by the CPU 202. In this embodiment, the operations of the first embodiment, second embodiment, and third embodiment are called mode 1, mode 2 and mode 3, respectively.

At first, in order to perform the operation of the mode 1, the CPU 202 writes data indicative of mode 1 to the mode register 140 via the CPU interface 204. Further, the second frame priority display data P2, the third frame priority display data P3 and the fourth frame priority display data P4 are stored in the regions 153, 152, and 151 of the memory 150, respectively. Furthermore, transparent color data T2 for the second frame, transparent color data T3 for the third frame and transparent color data T4 for the fourth frame are stored in the regions 154, 155, and 156 of the memory 150. Furthermore, border color data BC is stored in the region 157. Referring to the value of the mode register 140, the arbiter 103 recognizes that the operation of the mode 1 should be performed and performs the operations explained in the first embodiment.

Next, in order to perform the operation of the mode 2, the data indicative of mode 2 is stored in the mode register 140. The regions 151 and 152 of the memory 150 are not used and the transparent color data T1 for the first frame, the transparent color data T2 for the second frame, the transparent color data T3 for the third frame, and the transparent color data T4 for the fourth frame are stored in the regions 153, 154, 155, and 156. Further, the border color data BC is stored in the region 157. Referring to the value of the mode register 140, the arbiter 103 recognizes that the operation of the mode 2 should be preformed and performs the operations explained in the second embodiment. In the second embodiment, when the signal output from the output terminal EQ of the comparator 81 becomes an "H" level, signals to be output from the output terminal Y1, Y2 and Y3 are subjected to the signal changing operation. However, in this embodiment, signal output from the output terminal Y0 of the comparator 80 can be used in place of the signal output from the output terminal EQ.

Further, in order to perform the operation of the mode 3, the data indicative of mode 3 is stored in the mode register 140. The regions 151 and 152 of the memory 150 is not used and the transparent color data T1 for the first frame, the transparent color data T2 for the second frame, the transparent color data T3 for the third frame and the transparent color data T4 for the fourth frame are stored in the regions 153, 154, 155, and 156. Further, the border color data BC is stored in the region 157. Referring to the value of the mode register 140, the arbiter 103 recognizes that the operation of the mode 3 should be preformed and performs the operations explained in the third embodiment. In the third embodiment, when the signal output from the output terminal EQ of the comparator 81 becomes an "H" level, signals to be output from the output terminal Y1, Y2 and Y3 are subjected to the signal changing operation. However, in this embodiment, signal output from the output terminal Y0 of the comparator 80 can be used in place of the signal output from the output terminal EQ.

What is claimed is:

1. An image display control apparatus for displaying a desired image by superimposing images of a plurality of frames having a hierarchical relationship, the apparatus comprising:

a plurality of image data storing means corresponding to a plurality of frames having a hierarchical relationship, the plurality of image data storing means for storing image data of the plurality of frames;

priority display data storing means for storing priority display data for displaying image data of each frame on a priority basis;

first image data comparing means for comparing image data output from a first of the image data storing means corresponding to the frame having the highest order of the hierarchical relationship among the plurality of frames, with the priority display data stored in the priority display data storing means, the first image data comparing means producing a first comparison result for displaying the image data output from one of the image data storing means other than the first image data storing means when the image data output from the first image data storing means is equal to the priority display data; and image data selecting means for selecting and outputting image data output from one of the image data storing means other than the first image data storing means in response to the first comparison result, wherein said plurality of image data storing means are coupled in parallel to said image data selecting means.

2. The image display control apparatus according to claim 1, comprising:

transparent color data storing means for storing transparent color data for penetrating each frame other than the frame having the highest order among the plurality of frames;

border color data storing means for storing border color indicating border color to be displayed when transparent color data is written to all the frames other than the frame having the highest order; and second image data comparing means for comparing image data output from the image data storing means corresponding to frames other than the frame having the highest order among the plurality of frames with transparent color data stored in the transparent color data storing means, wherein the image data selecting means selects and outputs the border color data stored in the border color data storing means when the second image data comparing means indicates that the image data coincides with the transparent color data.

3. The image display control apparatus according to claim 2, wherein the image data selecting means includes:

a switch for selecting and outputting image data from one of the plurality of the image data storing means and border color data stored in the border color data storing means; and an arbiter for generating and outputting at least one control signal for controlling the switch based on results of comparisons made by the first image data comparing means and the second image data comparing means.

4. The image display control apparatus of claim 1 wherein the first image data comparing means produces a second comparison result for displaying the image data output from the first image data storing means when the image data output from the first image data storing means is not equal to the priority display data and the image data selecting means selects and outputs the image data output from the first image data storing means in response to the second comparison result.

5. The image display control apparatus according to claim 1, wherein the priority display data storing means stores priority display data for a plurality of second frames of lower priority than the frame having the highest order and the first comparison result indicates a frame of the plurality of second frames to be displayed.

6. An image display control apparatus for displaying a desired image by superimposing images of a plurality of frames having hierarchical relationship, the apparatus comprising:

a plurality of image data storing means corresponding to a plurality of frames having a hierarchical relationship, a plurality of image data storing means for storing image data of the plurality of frames;

transparent color data storing means for storing transparent color data for each frame, the transparent color data indicating that each frame is penetrated and image data of a frame having a lower priority in the hierarchical relationship is displayed when the frame having the lower priority is superimposed on another frame having a higher priority;

a plurality of comparing means corresponding to the plurality of the frames, the plurality of comparing means for comparing image data stored in the image data storing means with transparent color data for each frame stored in the transparent color data storing means;

hierarchy changing means for changing the hierarchical relationship of the plurality of frames, excluding a frame having a highest priority, in accordance with a frame display arrangement; and image data selecting means coupled to the hierarchy order changing means for selecting image data from one of the plurality of image data storing means based on comparisons made by the plurality of comparing means after the hierarchy changing means changes the hierarchical relationship of the plurality of the frames when the transparent color data for the frame having the highest priority of the hierarchical relationship is output from the image data storing means corresponding to the frame having the highest priority of the hierarchical relationship and for outputting the selected image data.

7. The image display control apparatus according to claim 6, wherein the image data selecting means includes:

a switch for selecting image data from one of the plurality of image data storing means; and an arbiter coupled to the hierarchy changing means and the switch for generating at least one control signal for controlling the switch based on results of comparisons made by the plurality of comparing means and the hierarchical relationship changed by the hierarchy changing means and for outputting the at least one control signal to the switch.

8. The image display control apparatus according to claim 7, wherein the arbiter sends at least one control signal to the switch such that the hierarchical order of two frames other than the frame having the highest priority among the plurality of frames are exchanged based on the hierarchical relationship changed by the hierarchy changing means.

9. The image display control apparatus according to claim 7, wherein the arbiter sends at least one control signal to the switch such that the hierarchical order of frames other than the frame having the highest priority among the plurality of frames are reversed, based on the hierarchical relationship changed by the hierarchy changing means.

10. An image display control apparatus for displaying a desired image by superimposing images of a plurality of frames having hierarchical relationship, the apparatus comprising:

a plurality of image data storing means corresponding to the plurality of frames having a hierarchical relationship, the plurality of image data storing means for storing image data of the plurality of frames;

priority display data storing means for storing priority display data for displaying image data of each frame on a priority basis;

transparent color data storing means for storing transparent color data for each frame, the transparent color data indicating that each frame is penetrated and image data of a frame having a lower priority in the hierarchical relationship is displayed when the frame having the lower priority is superimposed on another frame of a higher priority;

first image data comparing means for comparing image data output from the image data storing means corresponding to a frame having a highest priority in the hierarchical relationship among the plurality of the frames with priority display data stored in the priority display data storing means;

a plurality of second image data comparing means corresponding to the plurality of the frames, the plurality of second image data comparing means for comparing image data stored in the image data storing means with transparent color data for each frame stored in the transparent color data storing means;

a mode register for storing data indicative of a plurality of modes including a first mode having a highest priority frame and a plurality of other frames having equal priorities lower than the highest priority in the hierarchical relationship and in which image display control is performed based on the priority display data, and a second mode in which each of the plurality of frames has a higher priority or a lower priority than other frames in the hierarchical relationship; and image data selecting means for selecting and outputting image data output from the image data storing means storing image data of a frame having priority as indicated by the priority display data, among the plurality of image data storing means, when the priority display data is output from the image data storing means as a result of a comparison by the first image data comparing means when data indicative of the first mode is stored in the mode register, and for selecting one of the plurality of image data storing means based on a result of a comparison made by the plurality of second image data comparing means after changing the hierarchical relationship of the plurality of frames when transparent color data for the frame having the highest priority of the hierarchical relationship is output from the image data storing means corresponding to the frame having the highest priority of the hierarchical relationship and for outputting image data stored in the selected image data storing means when data indicative of the second mode is stored in the mode register.

* * * * *